No. 892,020. PATENTED JUNE 30, 1908.
G. L. WALBURN.
CRATE.
APPLICATION FILED JAN. 15, 1907.
3 SHEETS—SHEET 1.
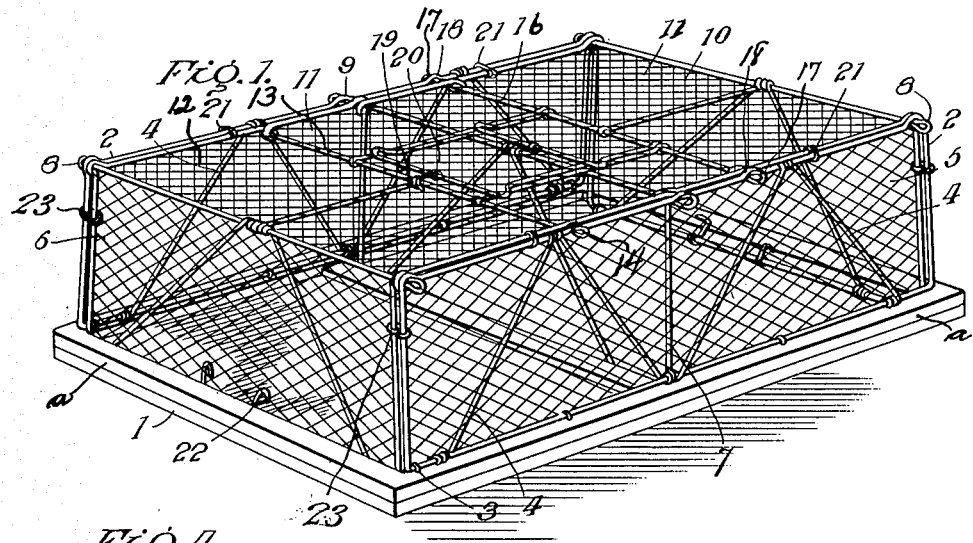
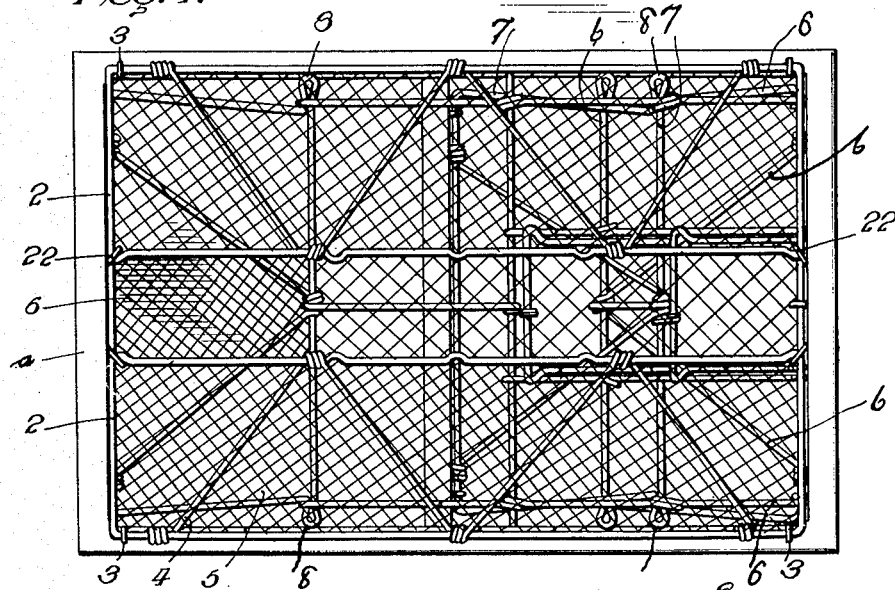
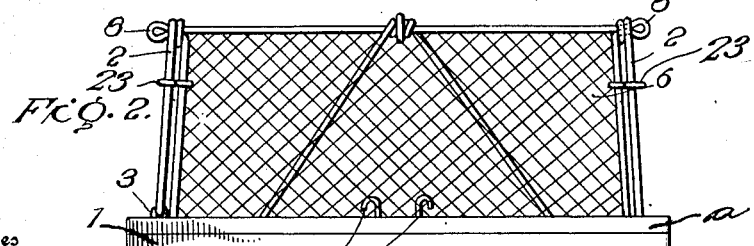

No. 892,020. PATENTED JUNE 30, 1908.
G. L. WALBURN.
CRATE.
APPLICATION FILED JAN. 15, 1907.
3 SHEETS—SHEET 2.
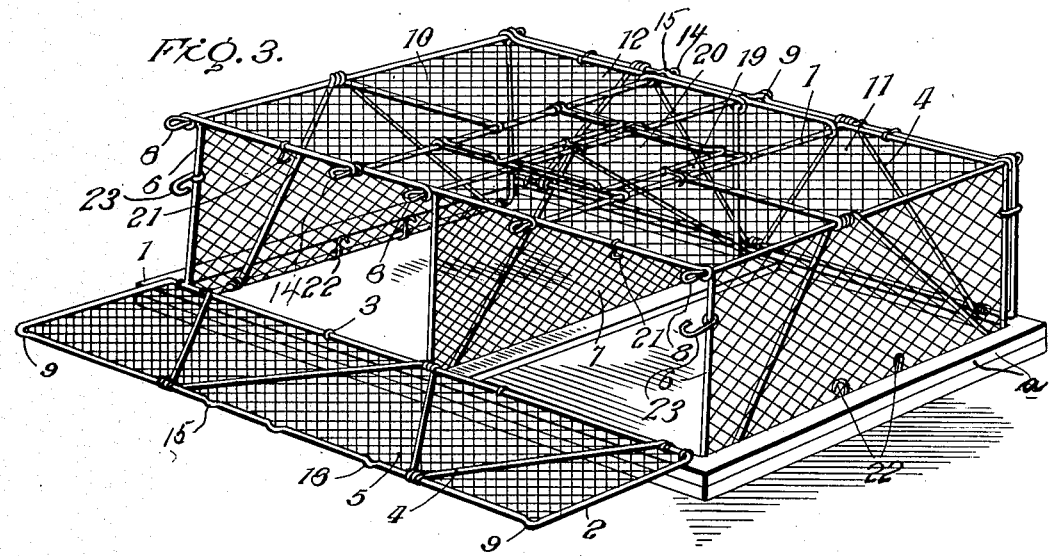
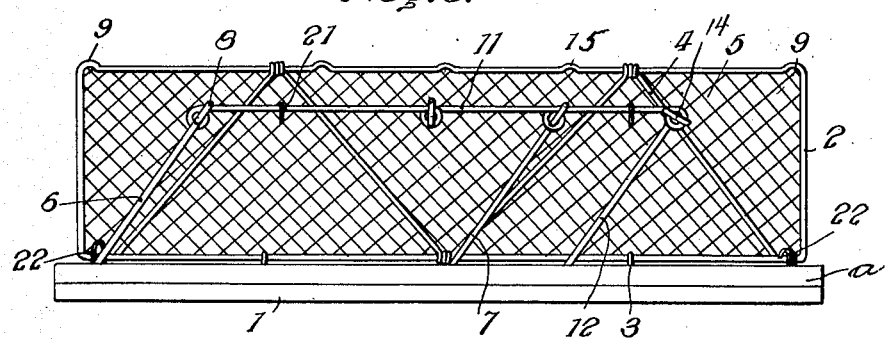
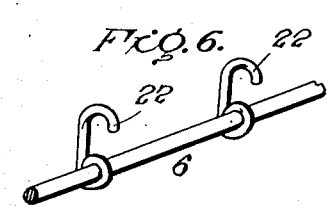
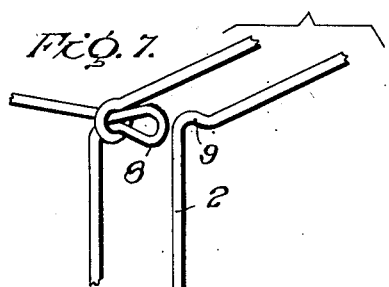
Witnesses
Frank B. Hoffman
Wilfred C. Lawson
Inventor
Gronderen L. Walburn
Frank A. Appleman,
Attorney.

No. 892,020. PATENTED JUNE 30, 1908.
G. L. WALBURN.
CRATE.
APPLICATION FILED JAN. 15, 1907.
3 SHEETS—SHEET 3.
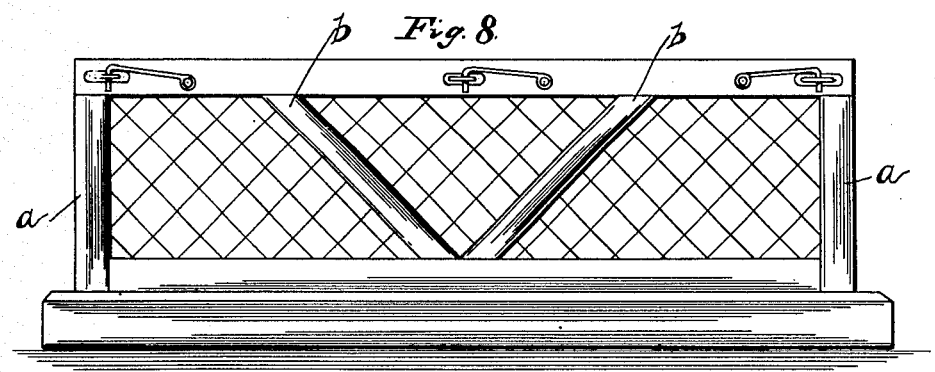
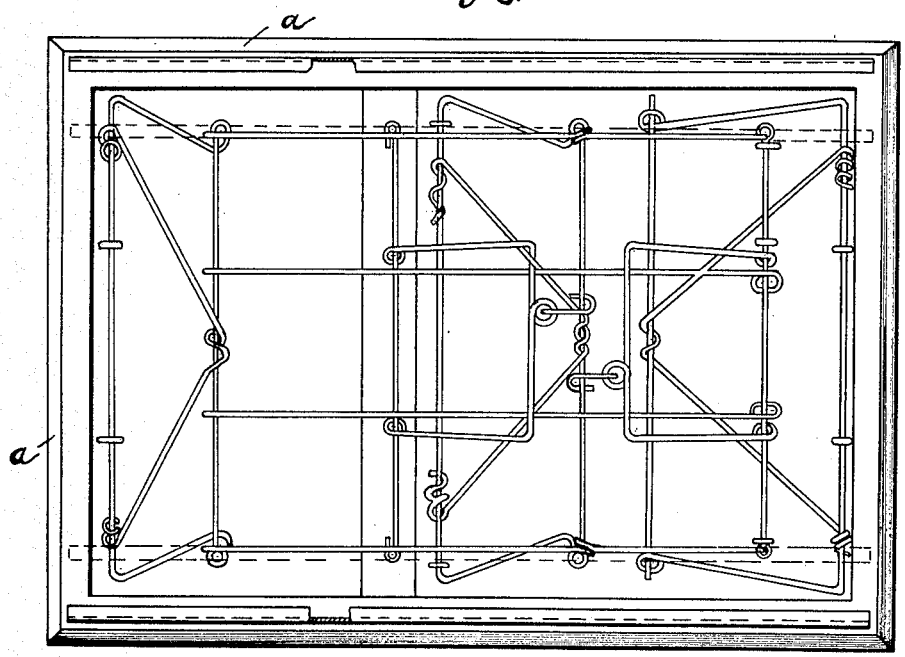

UNITED STATES PATENT OFFICE.

GRANDERSON L. WALBURN, OF PERU, KANSAS.

CRATE.

No. 892,020.

Specification of Letters Patent.

Patented June 30, 1908.

Application filed January 15, 1907. Serial No. 352,348.

*To all whom it may concern:*

Be it known that I, GRANDERSON L. WALBURN, a citizen of the United States of America, residing at Peru, in the county of Chautauqua and State of Kansas, have invented certain new and useful Improvements in Crates, of which the following is a specification.

This invention relates to new and useful improvements in crates and has relation more particularly to that class known as knockdown.

It is an object of this invention to provide a novel device of this character that may be readily folded within its base.

It is also an object of the invention to provide novel means whereby the crate is held in its expanded or operative position.

Furthermore, it is an object of this invention to produce a device of the character noted which will possess advantages in points of simplicity, efficiency and durability proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, in which—

Figure 1, is a view in perspective of a crate constructed in accordance with the present invention, said crate being shown in its expanded or operative position. Fig. 2, is an end view thereof. Fig. 3, is a view in perspective with one of the sides of the crate lowered. Fig. 4, is a view illustrating the crate folded. Fig. 5, is a view in side elevation, a side being removed and showing the crate partly folded. Figs. 6 and 7, are detail views illustrating the securing means. Fig. 8, is a view in elevation of a modified form of the invention. Fig. 9, is a top plan view with parts broken away of Fig. 8.

In the drawings 1, indicates a base which may be of wood or any suitable material and is preferably rectangular in shape.

The sides of the crate are similar in construction and each consists of a rectangular frame formed of a single piece of wire 2, of suitable weight, secured to the flanges $a$, arranged around the edges of the bottom 1. These flanges comprise strips secured to the bottom although it may be well to state that the same could be formed integral therewith. By having the sides secured to the flanges $a$, and the body secured to the base proper, the crate can be readily folded without any undue strain as the body proper will fit within the base whereas the sides will easily fold thereon. The connection between the sides of the crate and the flanges $a$, is made through the medium of the staples 3. The side frame is strengthened or reinforced by the wire 4, secured to the longitudinal edges thereof and bent to form a series of approximate V-shapes. This wire 4, is preferably of the same weight as the weight forming the frame. Also secured to the section is the wire netting or screen 5, the purpose of which being thought obvious.

The end sections 6, are formed similar to the side sections, being pivoted to the bottom 1, as is also the central partition 7, with the exception that the upper corners of the end sections and partition are pinched to form extending loops 8, which are adapted to be engaged by the curved portions 9, of the side sections. By this means it is to be observed that the side sections or the curved portions thereof spring over these projections of the end sections and partitions and the crate is thus held normally expanded or in an operative position. To the end sections is secured the top 10, which is of proper configuration and consists of two, sections 11 and 12, pivotally connected, one to the other and to the end sections. The section 11 projects or extends beyond the central partition 7, and is pivotally secured to the section 12, by the cross rod 13, which is also provided with extending loops 14, engaged by the curved portions 15, on the side frames. The sections are of such dimensions, one with relation to the other, that when the crate is folded they will be confined within the base of the crate.

In operation, after releasing the side sections, the main body part of the crate is inclined to the right. This inclination together with the natural spring in the metal composing the frame of the crate will permit of the hinge connecting the section 12 of the cover and the adjacent end to fold inward past the dead-center. Then the crate body is moved to the left and folded flat on the bottom of the crate. This operation is readily discernible from an inspection of Fig. 3.

The larger section 11, is provided with a reinforce or brace 16, which is provided with extending loops 17, adapted to be engaged by the curved portions 18, on the side frames.

Each of the compartments formed by the central partition is provided with openings 19, having a cover 20, said opening and cover being attained by any desired means. When the crate is expanded and the sides are in engagement with the loops of the top, end sections and partition, the sides are held against accidental displacement by the wire hooks 21, pivotally held by the top sections and engaging the frame.

When the crate is folded, the side sections swing down upon the top and are engaged by the hooks 22, which hold the crate in its folded position. These hooks are pivotally held by the lower portion of the crate ends. The central partition, the end sections and sections of the top may be provided with wire netting or screen as are the side sections.

On the ends of the sides are hooks 23, to engage the end sections of the crate in order that a stronger connection may be had between the side and end sections.

While the crate has been described as made of wire, the sides thereof may be made of angle iron so that the device may be used for animals or fowls of the larger class. This form of invention is shown in Figs. 8 and 9. The body portion of the device is constructed as hereinbefore described. The side frames, however, are formed of the angle strips a, and the intermediate braces b, also of angle iron. While the fastening device employed in this form of invention slightly differs from that shown in the first form, such differences easily fall within the sphere of mechanical skill.

Having fully described my invention what I claim as new and desire to secure by Letters Patent, is—

1. In combination, a base, side sections pivotally held thereby, end sections pivotally held thereby, a top formed in sections pivotally engaging the end sections and each other, and loops projecting from the top section, said side sections having curved portions to spring thereover.

2. In combination, a bottom, end sections pivoted thereto, side sections pivoted thereto, and a top pivoted to the end sections, said top being divided transversely into sections pivotally engaging each other.

3. In combination, a bottom, end sections pivoted thereto, side sections pivoted thereto, and a top pivoted to the end sections, said top being divided transversely into sections pivotally engaging each other, one of said sections of the top being larger than the other.

4. In combination, a base, side sections pivotally held thereby, end sections pivotally held thereby, a top formed in sections pivotally engaging the end sections and each other, loops projecting from the top engaged by the side sections and means carried by the top for engaging the side sections to hold said side sections against displacement from the loops.

In testimony whereof I affix my signature in the presence of two witnesses this 12th day of January, 1907.

GRANDERSON L. WALBURN.

Witnesses:
F. L. STEWART,
E. D. BENNETT.